(12) United States Patent
Wang et al.

(10) Patent No.: US 9,001,734 B2
(45) Date of Patent: Apr. 7, 2015

(54) METHOD AND SYSTEM FOR MEASUREMENT REPORT IN COORDINATED MULTI-POINT TRANSMISSION AND RECEPTION SYSTEM

(75) Inventors: Wenhuan Wang, Shenzhen (CN); Ke Yao, Shenzhen (CN); Kangsheng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 39 days.

(21) Appl. No.: 13/703,082

(22) PCT Filed: Jun. 8, 2011

(86) PCT No.: PCT/CN2011/075475
§ 371 (c)(1),
(2), (4) Date: Dec. 10, 2012

(87) PCT Pub. No.: WO2012/051861
PCT Pub. Date: Apr. 26, 2012

(65) Prior Publication Data
US 2013/0201914 A1    Aug. 8, 2013

(30) Foreign Application Priority Data
Oct. 22, 2010  (CN) .......................... 2010 1 0520366

(51) Int. Cl.
*H04W 4/00* (2009.01)
*H04W 24/10* (2009.01)

(52) U.S. Cl.
CPC .................................... *H04W 24/10* (2013.01)

(58) Field of Classification Search
CPC ..... H04W 84/12; H04W 80/04; H04W 88/06; H04W 74/08; H04W 52/40; H04W 24/00; H04B 7/0617; H04B 7/04; H04B 17/003; H04L 43/50; H04L 43/0852; H04L 43/08; H04L 29/06163; H04L 1/0001; H04J 3/16; H04J 3/1682; H04J 3/1694; H04J 9/00
USPC .................................. 370/328, 338, 334, 252
See application file for complete search history.

(56) References Cited

U.S. PATENT DOCUMENTS 7,373,155 B2 *  5/2008  Duan et al. .................. 455/456.2
8,326,303 B2 * 12/2012  Kumar et al. ................. 455/436
(Continued)

FOREIGN PATENT DOCUMENTS

| CN | 101594644 A | 12/2009 |
|---|---|---|
| CN | 101827387 A | 9/2010 |

(Continued)

OTHER PUBLICATIONS

Daewon Lee & Hanbyul Seo, Coordinated Multipoint Transmission and Reception in LTE-Advanced: Deployment Scenarios and Operational Challenges, Feb. 2012, IEEE Communications Magazine, pp. 148-155.*

(Continued)

*Primary Examiner* — Warner Wong
(74) *Attorney, Agent, or Firm* — Ling Wu; Stephen Yang; Ling and Yang Intellectual Property

(57) ABSTRACT

A method and system for measurement reporting in a Coordinated Multipoint transmission/reception (CoMP) system are disclosed in the present invention. The method includes: according to a CoMP measurement configuration message sent by a serving cell, when a measurement event report triggering criterion is satisfied, a terminal reporting a measurement report to the serving cell; wherein, the measurement event report triggering criterion includes: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold.

19 Claims, 3 Drawing Sheets

(56) References Cited

U.S. PATENT DOCUMENTS

| | | | |
|---|---|---|---|
| 8,412,256 B2 * | 4/2013 | Lee et al. | 455/522 |
| 8,483,745 B2 * | 7/2013 | Furueda et al. | 455/525 |
| 8,509,783 B2 * | 8/2013 | Iwamura | 455/438 |
| 8,649,456 B2 * | 2/2014 | Xia et al. | 375/267 |
| 2009/0275334 A1 * | 11/2009 | Xie et al. | 455/436 |
| 2010/0106828 A1 * | 4/2010 | Palanki et al. | 709/224 |
| 2010/0203887 A1 | 8/2010 | Kim et al. | |
| 2010/0239036 A1 | 9/2010 | Koo et al. | |
| 2011/0039547 A1 * | 2/2011 | van Rensburg et al. | 455/423 |
| 2011/0110251 A1 * | 5/2011 | Krishnamurthy et al. | 370/252 |
| 2011/0281586 A1 * | 11/2011 | Yu et al. | 455/436 |
| 2011/0294510 A1 * | 12/2011 | Wigren et al. | 455/440 |
| 2011/0306350 A1 * | 12/2011 | Barbieri et al. | 455/450 |
| 2013/0044602 A1 * | 2/2013 | Xiao et al. | 370/237 |

FOREIGN PATENT DOCUMENTS

| | | |
|---|---|---|
| CN | 101848485 A | 9/2010 |
| JP | 2009201072 A | 9/2009 |
| JP | 2010034688 A | 2/2010 |
| WO | 20100102424 A1 | 9/2010 |
| WO | 20100103886 A1 | 9/2010 |

OTHER PUBLICATIONS

International Search Report for PCT/CN2011/075475 dated Sep. 1, 2011.

* cited by examiner

METHOD AND SYSTEM FOR MEASUREMENT REPORT IN COORDINATED MULTI-POINT TRANSMISSION AND RECEPTION SYSTEM

TECHNICAL FIELD

The present invention relates to the mobile communication technique, and more specifically, to a method and system for measurement report in a Coordinated Multipoint transmission/reception (CoMP) system.

BACKGROUND OF THE RELATED ART

As a multi-carrier transmission mode, an Orthogonal Frequency Division Multiplex (OFDM) technology converts a data stream transmitted in high-speed into a group of data stream transmitted parallel in low-speed, which makes the sensitivity of system to the multipath fading channel frequency selectivity reduce greatly. Moreover, the introduction of cyclic prefix further enhances the capability of anti-Inter-symbol Interference (ISI) for the system. In addition, features of high bandwidth utilization rate and simple implementation make the OFDM be applied in the field of wireless communication more widely. For example, a Long Term Evolution (LTE) system based on orthogonal frequency division multiplexing access and LTE-Advanced system, the next generation of LTE, are all systems based on the OFDM technology.

Relative to the LTE system, the LTE-Advanced system uses certain new technologies such as relay, spectrum polymerization and CoMP and so on to enhance system performance. The original intention of introducing the CoMP is to solve the problem of Inter-Cell Interference (ICI) in an OFDM system so as to improve the throughput of a cell-edge User Equipment (UE), e.g., multiple evolved Nodes B (eNBs) eliminate the ICI collaboratively and even change interference signals into desired signals. With the further progress of the research, it is discovered that applications of the CoMP in the LTE-Advanced can improve the data transmission rate, cell edge throughput and/or system throughput. Therefore, the overwhelming majority of companies are very bullish about the CoMP technology.

From a transmission direction, the CoMP technology can be divided into an Uplink (UL) CoMP technology and a Downlink (DL) CoMP technology. Wherein, the DL CoMP can be divided into two categories: Joint Process (JP) mode and Coordinated Scheduling (CS)/Coordinated Beamforming (CB) mode.

a) CS/CB mode: only one node in multiple nodes sends data to the UE in an instant, which is similar to enhanced Inter-Cell Interference Coordination (ICIC), coordinated nodes do not share the data but share information related to channels, such as semi-static ICIC, coordinated Precoding Matrix Indicator (PMI) and coordinated beamforming and so on.

Wherein, in the coordinated scheduling/beamforming mode, the data sent to the UE are transmitted through a serving cell in which the UE is located; but a scheduling decision is under combination control, such as the control on the generation of interference in a coordinated cell and so on.

b) JP mode: multiple nodes send the data to one UE simultaneously, so as to improve the quality of received signals and/or eliminate the interference to other UEs.

The base stations and terminals participating in the CoMP coordination mainly include:

A serving cell: a cell sending control channels to the terminal. There is generally only one serving cell in the communication process between the terminal and the base station.

A measuring cell set: a cell set performing periodic channel state information measurement for the terminal. The set is semi-statically configured by the serving cell of the terminal.

A coordinated cell set: a cell set participating in sending service data to the terminal directly or indirectly.

Currently, with regard to the CoMP technology, the reached agreement mainly includes the following contents.

1. The Number of Cells in Participation should not be Excessive

The collaboration between multiple eNBs can improve the cell edge throughput rate and the average cell throughput rate in a large extent. However, sharing the data/Channel State Information (CSI) between multiple eNBs needs extremely large backhaul capacity, and thus the execution is very complicated. In order to reduce the complexity, it should be considered that the collaboration of a limited number of eNBs is used to serve specific UEs. Therefore, an issue related to the CoMP is how to select a coordinated cell cluster, so as to reach the maximization of cell throughput on the acceptable scheduling complexity and backhaul capacity.

2. The CoMP is Only Used for the Cell-Edge UE.

The CoMP can be used for the cell-edge UE and a cell-center UE theoretically, but a Signal to Interference plus Noise Ratio (SINR) of the cell-center UE itself is very high during non-CoMP. After the CoMP is used, the improvement of throughput is very tiny and information interaction is wasted. However, when the CoMP is used for the cell-edge UE, the inter-cell interference can be reduced evidently and the received power of the cell-edge UE can be enhanced. Therefore, most of companies consider that the CoMP should be only used for the cell-edge UE. The existing method includes selecting a coordinated UE according to the principle of SINR distribution, such as the coordination only to SINR<5 dB UEs.

3. It is Suitable for a Low-Speed UE

The multi-cell channel estimation can be optimized according to low-speed users. The feedback overhead of the low-speed users is small and the low-speed users can tolerate longer delay.

Currently, in the existing CoMP technology, a specific operating method for CoMP handover threshold is not considered. Therefore, the following problems mainly exist in the related art.

1) Since most of CoMP users are located at cell edges, the number of users located at the handover positions account for about 5% and the number of users located at the CoMP account for about 30% according to the analysis, excessive signaling overhead is caused if all the users report measurement sets frequently.

2) If simple Reference Signal Received Power (RSRP) threshold handover algorithms such as Abs(RSRPcell−RSRPsource)dB<RSRPthresholdin and Abs(RSRPcell−RSRPsource)dB>RSRPthresholdout are used, frequent in-set and out-set operations are easily triggered as the definition of thresholds is limited.

SUMMARY OF THE INVENTION

The technical problem solved by the present invention is to provide a method and system for measurement report in a Coordinated Multipoint transmission/reception (CoMP) system, which provides an optimized solution with respect to a threshold and event report triggering criterion for a center user switching to a CoMP mode.

In order to solve the above technical problem, the present invention provides a method for measurement report in a Coordinated Multipoint transmission/reception (CoMP) system, which comprises:

according to a CoMP measurement configuration message sent by a serving cell, a terminal reporting a measurement report to the serving cell when a measurement event report triggering criterion is satisfied;

wherein, the measurement event report triggering criterion includes: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold.

Alternatively, the method further comprises: the serving cell sending the CoMP measurement configuration message to the terminal through a radio resource control connection reconfiguration message.

Alternatively, the movement speed measurement value of the serving cell is: an accumulated value of differences of measurement values of the serving cell at every two neighboring measurement moments within a period of time.

Alternatively, the method further comprises: calculating the movement speed measurement value $\delta_{RSRP}$ of the serving cell according to the following formula:

$$\delta_{RSRP} = \sum_{n=1}^{N}(RSRP(n+dt) - RSRP(n));$$

the movement speed measurement value of the serving cell being lower than the preset first measurement threshold refers to: $\delta_{RSRP} < \theta_1$;

wherein, n=1, 2, . . . , N is a measurement moment, RSRP (n) is an RSRP value at n moment, and dt is a measurement interval; $\theta_1$ is the preset first measurement threshold.

Alternatively, the method further comprises: according to the measured RSRP of the serving cell and the measured RSRP of the measuring cell in a measuring cell set, the terminal calculating a ratio Signal Interference Ratio (SIR) of the measurement value of the serving cell to the measurement value of the measuring cell according to the following formula:

$$SIR = \frac{RSRP_s}{\sum_{k=1}^{N-1} RSRP_k};$$

the ratio of the measurement value of the serving cell to the measurement value of the measuring cell being lower than the preset second measurement threshold refers to: $SIR < \theta_2$;

wherein, $RSRP_S$ is the RSRP measurement value of the serving cell, and $RSRP_k$ is the RSRP measurement value of the measuring cell in the measuring cell set; $\theta_2$ is the preset second measurement threshold.

Alternatively, the method further comprises: the terminal arranging the measured RSRP of the serving cell and the measured RSRP of the measuring cell in the measuring cell set in a descending order according to a magnitude of RSRP signal intensity;

when reporting the measurement report to the serving cell, the terminal reporting one or multiple cells with the strongest RSRP signal intensity to the serving cell.

Alternatively, the method further comprises:

configuring sizes of the preset first measurement threshold and the second measurement threshold dynamically according to cell load and/or a CoMP mode.

The present invention further provides a system for measurement report in a Coordinated Multipoint transmission/reception (CoMP) system, which comprises: a CoMP measurement configuration device in a serving cell and a measurement report device in a terminal, wherein:

the CoMP measurement configuration device is configured to: configure and send a CoMP measurement configuration message to the terminal, and the CoMP measurement configuration message includes a following measurement event report triggering criterion: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold;

the measurement report device is configured to: according to the CoMP measurement configuration message sent by the serving cell, report a measurement report to the serving cell when the measurement event report triggering criterion is satisfied.

Alternatively, the CoMP measurement configuration device is configured to: send the CoMP measurement configuration message to the terminal through a radio resource control connection reconfiguration message.

Alternatively, the measurement report device is further configured to: according to an accumulated value of differences of measurement values of the serving cell at every two neighboring measurement moments within a period of time, calculate the movement speed measurement value $\delta_{RSRP}$ of the serving cell according to the following formula:

$$\delta_{RSRP} = \sum_{n=1}^{N}(RSRP(n+dt) - RSRP(n));$$

wherein, n=1, 2, . . . , N is a measurement moment, RSRP (n) is an RSRP value at n moment, and dt is a measurement interval.

Alternatively, the measurement report device is further configured to: according to the measured RSRP of the serving cell and the measured RSRP of the measuring cell in a measuring cell set, calculate a ratio Signal Interference Ratio (SIR) of the measurement value of the serving cell to the measurement value of the measuring cell according to the following formula:

$$SIR = \frac{RSRP_s}{\sum_{k=1}^{N-1} RSRP_k};$$

wherein, $RSRP_S$ is the RSRP measurement value of the serving cell, and $RSRP_k$ is the RSRP measurement value of the measuring cell in the measuring cell set.

Alternatively, the measurement report device is further configured to: arrange the measured RSRP of the serving cell and the measured RSRP of the measuring cell in the measuring cell set in a descending order according to a magnitude of RSRP signal intensity; when reporting the measurement report to the serving cell, report one or multiple cells with the strongest RSRP signal intensity to the serving cell.

Alternatively, the CoMP measurement configuration device is further configured to: configure sizes of the preset first measurement threshold and the second measurement threshold dynamically according to cell load and/or a CoMP mode.

Compared with the related art, the present invention at least has the following beneficial effects: with respect to the threshold and event report triggering criterion for the center user switching to the CoMP mode, a new event report triggering criterion is defined in the present invention, thereby avoiding reporting measurement sets frequently and performing in-set and out-set operations frequently. Moreover, in the present invention, a movement situation of a UE at the cell edge is acquired through the movement speed measurement value, it is ensured that the UE has enough residence time at the cell edge, and with regard to users who traverse the cell edge rapidly, no CoMP processing is executed, thus this part of users are not necessary to report measurement results, thereby reducing the signaling overhead.

PREFERRED EMBODIMENTS OF THE PRESENT INVENTION

Figure 1:
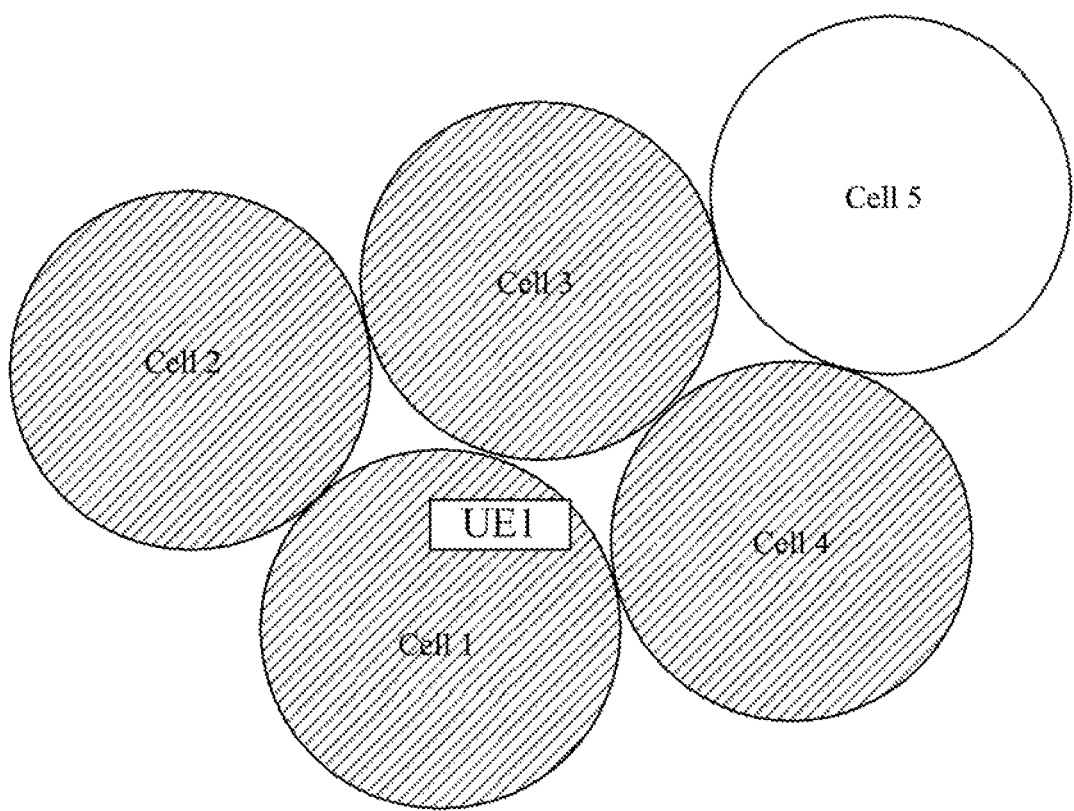
FIG. 1 is a schematic diagram of relation between the serving cell, neighboring cell and measuring cell set of the user.

In order to solve the problem existing in the related art, the present invention provides a method for measurement report in a Coordinated Multipoint transmission/reception (CoMP) system, and the following technical scheme is specifically used.

According to a CoMP measurement configuration message sent by a serving cell, when a measurement event report triggering criterion is satisfied, a UE reports a measurement report to the serving cell;

wherein, the measurement event report triggering criterion includes: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold.

Alternatively, the serving cell sends the CoMP measurement configuration message to the UE through a Radio Resource Control (RRC) connection reconfiguration message.

Alternatively, the CoMP measurement configuration message is implemented by expanding a Measurement Configuration IE in the RRC connection reconfiguration message.

Alternatively, the movement speed measurement value of the serving cell can be: an accumulated value of differences of measurement values of the serving cell at every two neighboring measurement moments within a preset duration time.

Alternatively, the movement speed measurement value $\delta_{RSRP}$ of the serving cell is calculated according to the following formula:

$$\delta_{RSRP} = \sum_{n=1}^{N} (RSRP(n+dt) - RSRP(n)),$$

wherein, n=1, 2, ..., N is a measurement moment, and dt is a measurement interval;

the movement speed measurement value of the serving cell being lower than the preset first measurement threshold refers to: $\delta_{RSRP}<\theta_1$, wherein $\theta_1$ is the preset first measurement threshold.

Alternatively, the ratio of the measurement value of the serving cell to the measurement value of the measuring cell refers to: a ratio of the sum of RSRP of the serving cell and RSRP of all measuring cells in a measuring cell set.

Alternatively, a ratio, Signal Interference Ratio (SIR), of the measurement value of the serving cell to the measurement value of the measuring cell is calculated according to the following formula:

$$SIR = \frac{RSRP_s}{\sum_{k=1}^{N-1} RSRP_k},$$

wherein, $RSRP_S$ is the RSRP measurement value of the serving cell, and $RSRP_k$ is the RSRP measurement value in the measuring cell set;

the ratio of the measurement value of the serving cell to the measurement value of the measuring cell being lower than the preset second measurement threshold refers to: $SIR<\theta_2$, wherein $\theta_2$ is the preset second measurement threshold.

Alternatively, the method also includes:

arranging the measured RSRP ($RSRP_S$) of the serving cell and the measured RSRP of the measuring cell in the measuring cell set in a descending order according to a magnitude of RSRP signal intensity;

when the UE reports the measurement report to the serving cell, reporting one or multiple cells with the strongest RSRP signal intensity to the serving cell.

Alternatively, the thresholds $\theta_2$ and $\theta_1$ are configured by a base station and broadcasted through a system broadcast message, and configurations of the thresholds $\theta_2$ and $\theta_1$ can be configured statically, or can be configured dynamically according to other factors including cell load and coordination modes such as Joint Process (JP) mode or Coordinated Beamforming (CB) mode and so on.

Specifically, the measurement report operation process for a CoMP user provided by the present invention mainly includes the following steps.

In step 1, a serving cell of a UE broadcasts a measuring cell set of the current cell.

Wherein, the measuring cell set can be carried through a system broadcast message, and the UE can be informed of the measuring cell set periodically or in a certain predefined way in the cell.

In step 2, a serving cell of a terminal sends an RRC Connection Reconfiguration message, and sends a CoMP measurement configuration message to the UE through the RRC Connection Reconfiguration message.

In step 3, the UE detects cells in the measuring cell set continuously, once one or more cells in the measuring cell set satisfy an event triggering criterion, the UE reports a measurement report to the serving cell.

Wherein, when a cell-center user performs handover to a CoMP mode, a measurement report criterion of event driven is used, that is, when the triggering criterion of reporting a measurement event is satisfied, the terminal reports the measurement event to the serving cell. Specifically, the triggering criterion of reporting the measurement event is shown as follows.

1) $SIR < \theta_2$, wherein $$SIR = \frac{RSRP_s}{\sum_{k=1}^{N-1} RSRP_k},$$

$RSRP_S$ is the RSRP measurement value of the serving cell, $RSRP_k$ is the RSRP measurement value in the measuring cell set, and $\theta_2$ is the preset threshold.

2) $\delta_{RSRP,S} < \theta_1$, and $\theta_1$ is the preset threshold.

In step 4, the serving cell of the UE receives the measurement report reported by the UE, and according to a preset coordinated cell criterion, determines the ultimately participating coordinated cells.

Wherein, the serving cell can preset the coordinated cell criterion according to different demands of the practical applications.

In step 5, the serving cell of the UE sends a coordination message to the UE and the coordinated cells of the UE, and the serving cell and the coordinated cells start the subsequent coordination process.

In order to be convenient for elaborating the present invention, the implementation of the technical scheme of the present invention will be further described in detail in combination with the accompanying drawings and specific examples below.

As shown in FIG. 1, a terminal UE1 is located in a cell 1, cells 2~5 are neighboring cells of the cell 1. Assume that the cell 1 is a serving cell of the UE1, and the cells 2~4 are a measuring cell set of the UE1. The cell 5 is not the measuring cell set of the UE1.

Figure 2:
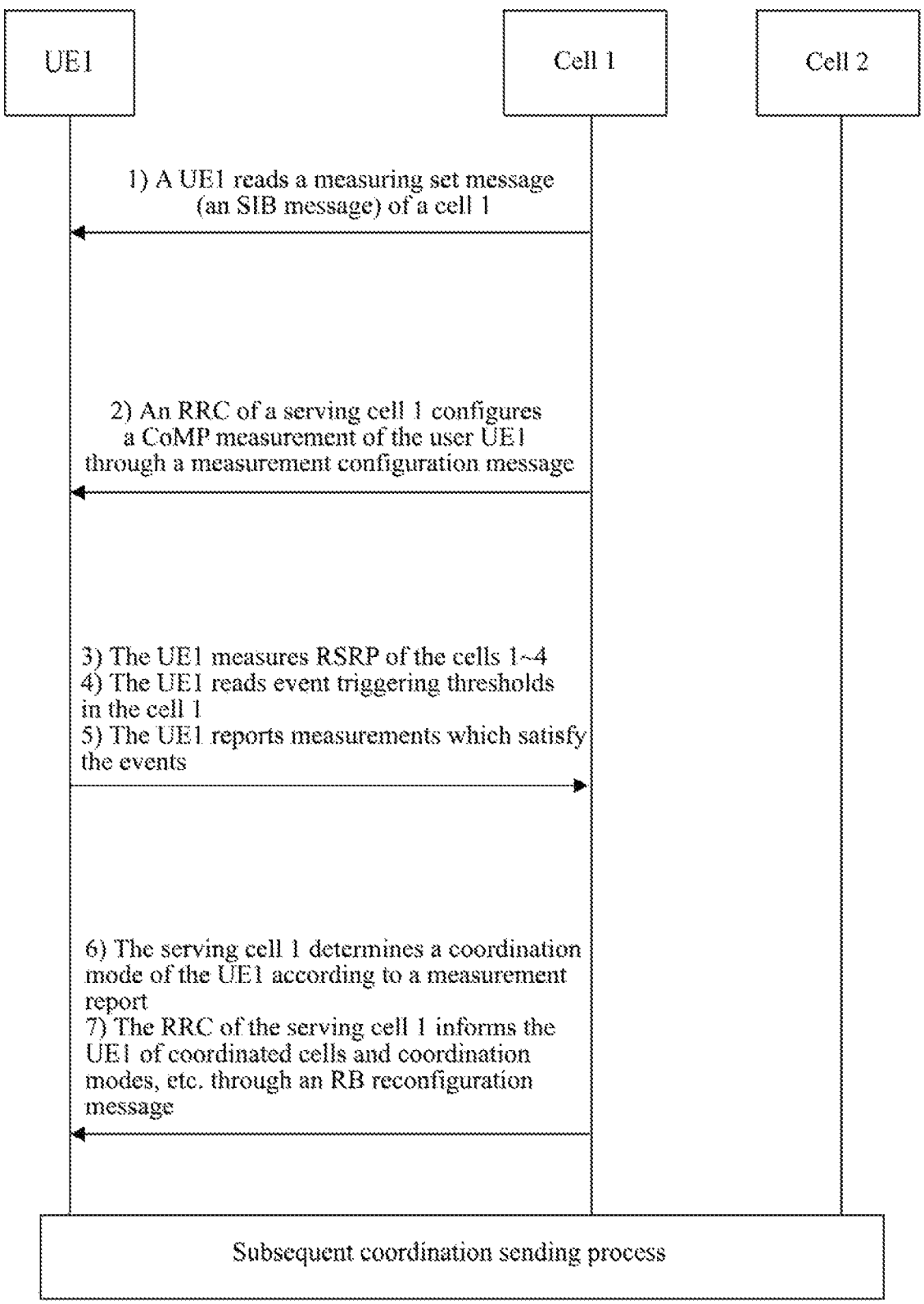
FIG. 2 is a flow diagram of measurement report operation for the coordinated cell in the CoMP system according to the example of the present invention.

FIG. 2 is a flow diagram of the method for measurement report according to the example of the present invention. In the example, an LTE system is taken as an example, and as shown in FIG. 2, the flow is specifically described as follows, which includes the following steps.

In step 1, a UE1 obtains message of a measuring cell set (i.e. cells 2~4) adjacent to a serving cell by reading a System Information Block (SIB) message.

In the LTE, a system message is carried through the SIB message of a Broadcast Channel (BCH). It is assumed that a cell 1 determines that the cells 2~4 are the measuring cell set of the cell 1, the cell 1 newly defines the measuring cell set by expanding the SIB message namely the SIB message in the LTE and performs broadcasting in the current cell.

In step 2, a Radio Resource Controller (RRC) of a serving cell 1 configures a CoMP measurement of the UE1 through a configuration message.

Wherein, a CoMP measurement configuration of the UE1 to the cells 2~4 can be implemented by expanding a Measurement Configuration IE in an RRC Connection Reconfiguration message, that is, a measurement configuration message of CoMP is formed from the expansion of the Measurement Configuration IE.

Specifically, in Measurement Configuration, a Measurement ID is used to identify each measurement object and report combination, each measurement includes two parts: Measurement Object and Report Configuration, wherein the Measurement Object defines an object of UE required to be measured, and the Report Configuration defines events and thresholds for triggering a measurement report, and also defines report modes: periodic report, event report and event periodic report.

The existing events for triggering the measurement report mainly include the following kinds A1: a measurement value of the serving cell is higher than a preset measurement threshold.

A2: the measurement value of the serving cell is lower than the preset measurement threshold.

A3: a measurement value of a neighboring Evolved-UMTS Terrestrial Radio Access (EUTRA) cell is superior to a preset offset value of a target cell.

A4: the measurement value of the neighboring EUTRA cell is higher than the preset measurement threshold.

A5: the measurement value of the serving cell is lower than the preset measurement threshold and a measurement value of a neighboring cell is higher than another preset measurement threshold.

B1: a measurement value of an Inter RAT neighboring cell is higher than the preset measurement threshold.

B2: the measurement value of the target cell is lower than the preset measurement threshold and the measurement value of the Inter RAT neighboring cell is higher than another preset measurement threshold.

In the example, the CoMP measurement configures a measurement event report triggering criterion, and the event for triggering the measurement report is the newly defined A6, that is:

A6: a ratio of the sum of the measurement value of the serving cell and a measurement value of a measuring cell is lower than the preset measurement threshold, and the sum of differences of measurement values at two continuous measurement moments of the serving cell within a period of time is lower than the preset measurement threshold.

In step 3, the UE1 measures RSRP of the cells 1~4.

In step 4, the UE1 reads event triggering thresholds $\theta_2$ and $\theta_1$ in the serving cell 1.

In step 5, the UE1 reports measurements which satisfy the event report triggering criterion.

In step 6, the serving cell 1 determines a coordination mode of the UE1 according to the measurement report reported by the UE1, that is, whether to perform CoMP coordination to the UE1 is determined.

In step 7, the RRC of the serving cell 1 informs the UE1 of the coordinated cells and coordination modes in the way of the configuration message, etc.

Then, the serving cell and the coordinating cells will execute the subsequent coordination process.

Moreover, in the examples of the present invention, the method of dynamic configuration of the serving cell can be used for configurations of the thresholds $\theta_2$ and $\theta_1$. For example, values of the thresholds $\theta_2$ and $\theta_1$ can be adjusted according to cell load and CoMP processing modes.

TABLE 1

| | CoMP mode | |
|---|---|---|
| Cell load | CB | JP |
| light | $\theta_2 = \theta_2^{11}, \theta_1 = \theta_1^{11}$ | $\theta_2 = \theta_2^{12}, \theta_1 = \theta_1^{12}$ |
| heavy | $\theta_2 = \theta_2^{21}, \theta_1 = \theta_1^{21}$ | $\theta_2 = \theta_2^{22}, \theta_1 = \theta_1^{22}$ |

With reference to table 1, if load of the neighboring cell is heavier, since a JP mode needs more resource consumption, smaller thresholds $\theta_2 = \theta_2^{21}$ and $\theta_1 = \theta_1^{21}$ can be used at the moment, which makes the number of users who satisfy the thresholds decrease. On the contrary, when load of the neighboring cell is lighter, larger thresholds $\theta_2=\theta_2^{11}$ and $\theta_1=\theta_1^{11}$ can be used to make the number of users who satisfy the thresholds increase.

The method for measurement report of the present invention will be further introduced in detail in combination with the accompanying drawings and specific application examples below.

Application Example 1

Figure 3:
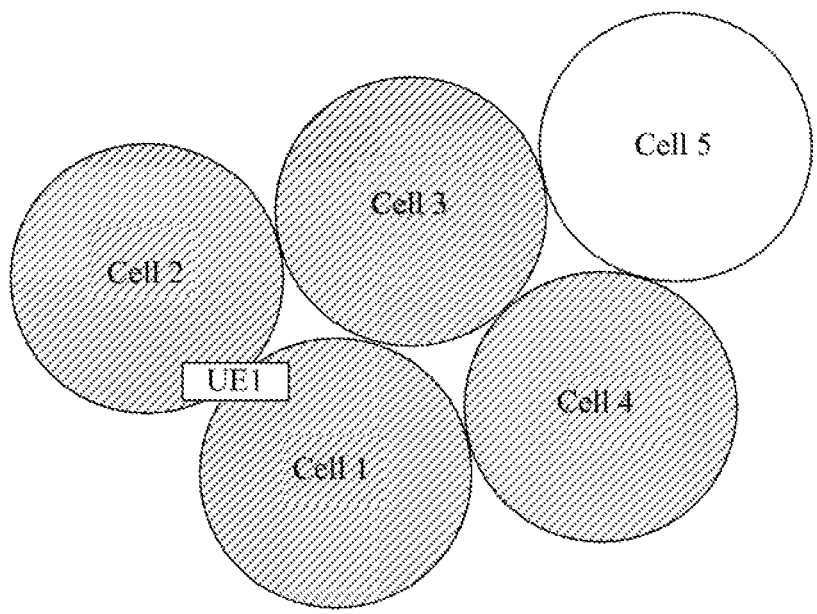
FIG. 3 illustrates the position of UE1 in a condition of two coordinated cells.

With reference to FIG. 3, in the example, according to the measurement configuration, a user UE1 completes measurements of RSRP and $\delta_{RSRP}$ of a cell set {cell 2, cell 3, cell 4}, and uses public pilot symbols of the cells 1~4 respectively to perform measurement. It is assumed that the measurement values satisfy $RSRP_1>RSRP_2>RSRP_3>RSRP_4$, meanwhile, the UE1 calculates $$SIR = \frac{RSRP_1}{\sum_{k=2}^{4} RSRP_k}$$

and $\delta_{RSRP,1}$ and compares the $$SIR = \frac{RSRP_1}{\sum_{k=2}^{4} RSRP_k}$$

and $\delta_{RSRP,1}$ with the $\theta_2$ and $\theta_1$, once a report condition is satisfied, the UE1 reports a measurement report.

In the reported measurement report, the UE1 can report a serving cell and a cell with the strongest signal intensity in the signal intensity order. At the point, the cell 2 can be taken as a coordinated cell, and the position of the UE1 is as shown in FIG. 3.

Application Example 2

Figure 4:
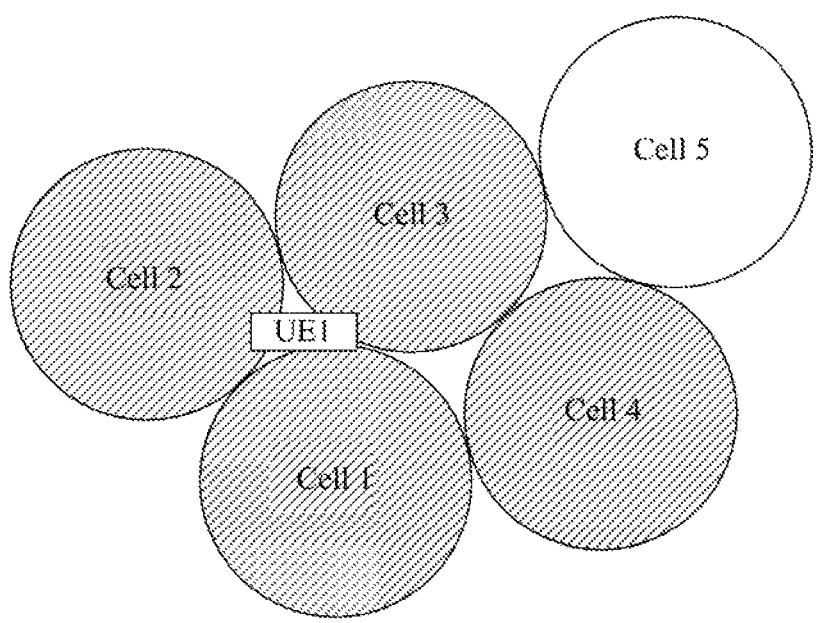
FIG. 4 illustrates the position of UE1 in a condition of three coordinated cells.

With reference to FIG. 4, in the example, a user UE1 completes measurements of cell RSRP and $\delta_{RSRP}$ of a cell set {cell 2, cell 3, cell 4} according to the measurement configuration, and if a signal intensity satisfies $RSRP_1>RSRP_2>RSRP_3>RSRP_4$, the UE1 calculates $$SIR = \frac{RSRP_1}{\sum_{k=2}^{4} RSRP_k}$$

and $\delta_{RSRP,1}$ at the same time and compares the $$SIR = \frac{RSRP_1}{\sum_{k=2}^{4} RSRP_k}$$

and $\delta_{RSRP,1}$ with the $\theta_2$ and $\theta_1$, once a report condition is satisfied, the UE1 reports a measurement report.

Alternatively, if a difference $RSRP_2-RSRP_3$ of signal intensities of two measuring cells with the strongest signal intensity is less than a certain value, the UE1 can report the cell 2 and cell 3 simultaneously. At the point, the cell 2 and cell 3 can be taken as coordinated cells simultaneously, and the position of the UE1 is as shown in FIG. 4.

It can be seen from the above description that, the threshold $\theta_1$ actually reflects the movement situation at the cell edge of the UE1, being less than the threshold $\theta_1$ ensures that the UE1 has enough residence time at the cell edge, and with regard to users who traverse the cell edge rapidly, no CoMP processing is executed, thus this part of users are not necessary to report measurement results, thereby reducing the signaling overhead.

In addition, the example of the present invention also provides a system for measurement report in a Coordinated Multi-point transmission/reception (CoMP) system (not shown by figure), and the system mainly includes a CoMP measurement configuration device in a serving cell and a measurement report device in a terminal, wherein:

the CoMP measurement configuration device is configured to: configure and send a CoMP measurement configuration message to the terminal, and the CoMP measurement configuration message includes a following measurement event report triggering criterion: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold;

the measurement report device is configured to: according to the CoMP measurement configuration message sent by the serving cell, report a measurement report to the serving cell when the measurement event report triggering criterion is satisfied.

Alternatively, the CoMP measurement configuration device is configured to: send the CoMP measurement configuration message to the terminal through a radio resource control connection reconfiguration message.

Alternatively, the measurement report device is further configured to: according to an accumulated value of differences of measurement values of the serving cell at every two neighboring measurement moments within a period of time, calculate the movement speed measurement value $\delta_{RSRP}$ of the serving cell according to the following formula:

$$\delta_{RSRP} = \sum_{n=1}^{N} (RSRP(n+dt) - RSRP(n));$$

wherein, n=1, 2, . . . , N is a measurement moment, RSRP (n) is an RSRP value at n moment, and dt is a measurement interval.

Alternatively, the measurement report device is further configured to: according to the measured RSRP of the serving cell and the measured RSRP of the measuring cell in a measuring cell set, calculate a ratio Signal Interference Ratio (SIR) of the measurement value of the serving cell to the measurement value of the measuring cell according to the following formula:

$$SIR = \frac{RSRP_s}{\sum_{k=1}^{N-1} RSRP_k};$$

wherein, $RSRP_S$ is the RSRP measurement value of the serving cell, and $RSRP_k$ is the RSRP measurement value of the measuring cell in the measuring cell set.

Alternatively, the measurement report device is further configured to: arrange the measured RSRP of the serving cell and the measured RSRP of the measuring cell in the measuring cell set in a descending order according to a magnitude of RSRP signal intensity; when reporting the measurement report to the serving cell, report one or multiple cells with the strongest RSRP signal intensity to the serving cell.

Alternatively, the CoMP measurement configuration device is further configured to: configure sizes of the preset first measurement threshold and the second measurement threshold dynamically according to cell load and/or a CoMP mode.

INDUSTRIAL APPLICABILITY

Compared with the related art, the present invention at least has the following beneficial effects: with respect to the threshold and event report triggering criterion for the center user switching to the CoMP mode, a new event report triggering criterion is defined in the present invention, thereby avoiding reporting measurement sets frequently and performing in-set and out-set operations frequently. Moreover, in the present invention, a movement situation of a UE at the cell edge is acquired through the movement speed measurement value, it is ensured that the UE has enough residence time at the cell edge, and with regard to users who traverse the cell edge rapidly, no CoMP processing is executed, thus this part of users are not necessary to report measurement results, thereby reducing the signaling overhead.

What is claimed is:

1. A method for measurement report in a Coordinated Multipoint transmission/reception (CoMP) system, comprising:
according to a CoMP measurement configuration message sent by a serving cell, a terminal reporting a measurement report to the serving cell when a measurement event report triggering criterion is satisfied;
wherein, the measurement event report triggering criterion includes: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold;
wherein the movement speed measurement value of the serving cell is: an accumulated value of differences of measurement values of the serving cell at every two neighboring measurement moments within a period of time.

2. The method according to claim 1, further comprising:
the serving cell sending the CoMP measurement configuration message to the terminal through a radio resource control connection reconfiguration message.

3. The method according to claim 1, further comprising:
calculating the movement speed measurement value $\delta_{RSRP}$ of the serving cell according to the following formula:

$$\delta_{RSRP} = \sum_{n=1}^{N} (RSRP(n+dt) - RSRP(n));$$

the movement speed measurement value of the serving cell being lower than the preset first measurement threshold refers to: $\delta_{RSRP} < \theta_1$;

wherein, n=1, 2, . . . , N is a measurement moment, RSRP (n) is an RSRP value at n moment, and dt is a measurement interval; $\theta_1$ is the preset first measurement threshold.

4. The method according to claim 1, further comprising:
according to the measured RSRP of the serving cell and the measured RSRP of the measuring cell in a measuring cell set, the terminal calculating a ratio, Signal Interference Ratio (SIR), of the measurement value of the serving cell to the measurement value of the measuring cell according to the following formula:

$$SIR = \frac{RSRP_s}{\sum_{k=1}^{N-1} RSRP_k};$$

the ratio of the measurement value of the serving cell to the measurement value of the measuring cell being lower than the preset second measurement threshold refers to: $SIR < \theta_2$;

wherein, $RSRP_S$ is the RSRP measurement value of the serving cell, and $RSRP_k$ is the RSRP measurement value of the measuring cell in the measuring cell set; $\theta_2$ is the preset second measurement threshold.

5. The method according to claim 1, further comprising:
the terminal arranging the measured RSRP of the serving cell and the measured RSRP of the measuring cell in the measuring cell set in a descending order according to a magnitude of RSRP signal intensity;
when reporting the measurement report to the serving cell, the terminal reporting one or multiple cells with the strongest RSRP signal intensity to the serving cell.

6. The method according to claim 1, further comprising:
configuring sizes of the preset first measurement threshold and the second measurement threshold dynamically according to cell load and/or a CoMP mode.

7. A system for measurement report in a Coordinated Multipoint transmission/reception (CoMP) system, comprising: a CoMP measurement configuration device in a serving cell and a measurement report device in a terminal, wherein:
the CoMP measurement configuration device is configured to: configure and send a CoMP measurement configuration message to the terminal, and the CoMP measurement configuration message includes a following measurement event report triggering criterion: a movement speed measurement value of the serving cell being lower than a preset first measurement threshold, and a ratio of a Reference Signal Received Power (RSRP) measurement value of the serving cell to an RSRP measurement value of a measuring cell being lower than a preset second measurement threshold;
the measurement report device is configured to: according to the CoMP measurement configuration message sent by the serving cell, report a measurement report to the serving cell when the measurement event report triggering criterion is satisfied;
wherein the movement speed measurement value of the serving cell is: an accumulated value of differences of measurement values of the serving cell at every two neighboring measurement moments within a period of time.

8. The system according to claim 7, wherein:
the CoMP measurement configuration device is configured to: send the CoMP measurement configuration message to the terminal through a radio resource control connection reconfiguration message.

9. The system according to claim 7, wherein:
the measurement report device is further configured to: calculate the movement speed measurement value $\delta_{RSRP}$ of the serving cell according to the following formula:

$$\delta_{RSRP} = \sum_{n=1}^{N}(RSRP(n+dt) - RSRP(n));$$

wherein, n=1, 2, . . . , N is a measurement moment, RSRP (n) is an RSRP value at n moment, and dt is a measurement interval.

10. The system according to claim 7, wherein:
the measurement report device is further configured to: according to the measured RSRP of the serving cell and the measured RSRP of the measuring cell in a measuring cell set, calculate a ratio Signal Interference Ratio (SIR) of the measurement value of the serving cell to the measurement value of the measuring cell according to the following formula:

$$SIR = \frac{RSRP_s}{\sum_{k=1}^{N-1} RSRP_k};$$

wherein, $RSRP_S$ is the RSRP measurement value of the serving cell, and $RSRP_k$ is the RSRP measurement value of the measuring cell in the measuring cell set.

11. The system according to claim 7, wherein:
the measurement report device is further configured to: arrange the measured RSRP of the serving cell and the measured RSRP of the measuring cell in the measuring cell set in a descending order according to a magnitude of RSRP signal intensity; when reporting the measurement report to the serving cell, report one or multiple cells with the strongest RSRP signal intensity to the serving cell.

12. The system according to claim 7, wherein:
the CoMP measurement configuration device is further configured to: configure sizes of the preset first measurement threshold and the second measurement threshold dynamically according to cell load and/or a CoMP mode.

13. The method according to claim 2, further comprising:
the terminal arranging the measured RSRP of the serving cell and the measured RSRP of the measuring cell in the measuring cell set in a descending order according to a magnitude of RSRP signal intensity;
when reporting the measurement report to the serving cell, the terminal reporting one or multiple cells with the strongest RSRP signal intensity to the serving cell.

14. The method according to claim 1, further comprising:
the terminal arranging the measured RSRP of the serving cell and the measured RSRP of the measuring cell in the measuring cell set in a descending order according to a magnitude of RSRP signal intensity;
when reporting the measurement report to the serving cell, the terminal reporting one or multiple cells with the strongest RSRP signal intensity to the serving cell.

15. The method according to claim 3, further comprising:
the terminal arranging the measured RSRP of the serving cell and the measured RSRP of the measuring cell in the measuring cell set in a descending order according to a magnitude of RSRP signal intensity;
when reporting the measurement report to the serving cell, the terminal reporting one or multiple cells with the strongest RSRP signal intensity to the serving cell.

16. The method according to claim 4, further comprising:
the terminal arranging the measured RSRP of the serving cell and the measured RSRP of the measuring cell in the measuring cell set in a descending order according to a magnitude of RSRP signal intensity;
when reporting the measurement report to the serving cell, the terminal reporting one or multiple cells with the strongest RSRP signal intensity to the serving cell.

17. The method according to claim 2, further comprising:
configuring sizes of the preset first measurement threshold and the second measurement threshold dynamically according to cell load and/or a CoMP mode.

18. The method according to claim 1, further comprising:
configuring sizes of the preset first measurement threshold and the second measurement threshold dynamically according to cell load and/or a CoMP mode.

19. The method according to claim 3, further comprising:
configuring sizes of the preset first measurement threshold and the second measurement threshold dynamically according to cell load and/or a CoMP mode.

* * * * *